(12) United States Patent
Becker et al.

(10) Patent No.: US 8,020,935 B2
(45) Date of Patent: Sep. 20, 2011

(54) ELECTRICALLY HEIGHT ADJUSTABLE HEAD REST DEVICE FOR AN AUTOMOTIVE VEHICLE

(75) Inventors: Burckhard Becker, Solingen (DE); Wilfried Beneker, Leichlingen (DE); Van-Toan Ho, Solingen (DE)

(73) Assignee: C. Rob. Hammerstein GmbH & Co. KG, Solingen (DE)

( * ) Notice: Subject to any disclaimer, the term of this patent is extended or adjusted under 35 U.S.C. 154(b) by 117 days.

(21) Appl. No.: 12/397,860

(22) Filed: Mar. 4, 2009

(65) Prior Publication Data
US 2009/0224590 A1  Sep. 10, 2009

(30) Foreign Application Priority Data
Mar. 4, 2008 (DE) .......... 10 2008 012 529

(51) Int. Cl.
*B60N 2/48* (2006.01)
(52) U.S. Cl. ........................................ 297/410
(58) Field of Classification Search ............ 297/353, 297/410, 411.36
See application file for complete search history.

(56) References Cited

U.S. PATENT DOCUMENTS

| | | | | |
|---|---|---|---|---|
| 4,222,608 A * | 9/1980 | Maeda | | 297/410 |
| 4,923,250 A * | 5/1990 | Hattori | | 297/410 |
| 5,288,129 A * | 2/1994 | Nemoto | | 297/410 |
| 5,433,508 A * | 7/1995 | Akima et al. | | 297/410 |
| 5,836,651 A * | 11/1998 | Szerdahelyi et al. | | 297/410 |
| 6,088,640 A * | 7/2000 | Breed | | 701/45 |
| 6,543,852 B2 * | 4/2003 | Mori | | 297/410 |
| 7,232,187 B1 * | 6/2007 | Sundararajan et al. | | 297/410 |
| 7,445,290 B2 * | 11/2008 | Kopetzky et al. | | 297/410 |
| 2010/0213748 A1 * | 8/2010 | Pedrero Iniguez et al. | | 297/410 |

FOREIGN PATENT DOCUMENTS
DE  10 2006 047 170 A1  12/2007
* cited by examiner

*Primary Examiner* — Peter R. Brown
(74) *Attorney, Agent, or Firm* — McCarter & English, LLP

(57) ABSTRACT

An electrically height-adjustable head rest device of a motor vehicle seat having a head rest, one or two bars carrying the head rest, a cross member, which is connected to at least one bar and comprises an internal thread, and a motor-spindle unit comprising a spindle engaging the internal thread. On the cross member and/or on the motor-spindle unit there is provided a guide seat for a guide part.

17 Claims, 6 Drawing Sheets

ELECTRICALLY HEIGHT ADJUSTABLE HEAD REST DEVICE FOR AN AUTOMOTIVE VEHICLE

CROSS-REFERENCE TO RELATED APPLICATIONS

This application claims priority to German Patent Application No. DE 10 2008 012 529.6, filed Mar. 4, 2008, which is hereby incorporated by reference in its entirety as part of the present disclosure.

BACKGROUND OF THE INVENTION

The invention relates to an electrically height-adjustable head rest device in a seat back of a motor vehicle seat. The head rest device comprises a head rest, one or two bars carrying said head rest, one cross member, which is connected to at least one bar and has an internal thread, and one motor-spindle unit comprising a spindle, which engages the internal thread.

Such a head rest device is known for example from the document DE 10 2006 047 170 A1. When the head rest device is mounted inside a seat back, the at least one bar is fixed by a sliding piece that is provided in an upper edge of the seat back and forms an outlet opening for the bar. The head rest device is further connected to carrying parts of the seat back frame. Usually, the motor-spindle unit is connected to the seat back frame. As a result, its allocation is fixed.

Prior to mounting, the motor-spindle unit is not fixed though; it can rotate about the spindle and thus adopt any position with respect to the head rest. Irrespective thereof, some vehicle manufacturers would like that the motor-spindle unit needs not be connected to the structure of the seat back but that fastening rather occurs otherwise, in particular only through the sliding pieces mentioned. In this case, free rotation of the motor-spindle unit must be avoided. Other vehicle manufacturers want to be supplied with complete head rest devices that are to be delivered in a given condition, for example with the head rest in a completely retracted position. Only in this condition but not in the condition in which the head rest is completely extended, the motor-spindle unit must be allocated to the other parts for shipment and delivery, meaning it is not allowed to rotate freely. When the head rest is raised in the position in which it is spaced the greatest distance from the upper edge of the seat back, such a guide is not needed since the motor-spindle unit is fixed to the seat back in the mounted condition. Finally, some manufacturers want a guide between motor-spindle unit and cross member as a matter of principle, irrespective of their specifications regarding the delivery condition; others again do not want any guide.

Accordingly, the manufacturer of the head rest device must adapt to different wishes of the vehicle's manufacturer. In order to simplify the production of the very head rest device, it would be convenient to provide for a head rest device that would cover almost all the demands of the current automotive manufacturers. This is where the invention comes in.

SUMMARY OF THE INVENTION

It is the object of the invention to further develop the head rest device of the type mentioned herein above in such a manner that for different demands of automotive manufacturers a head rest device is proposed, which can be rapidly complemented with additional parts or from which additional parts can be rapidly removed so that it can be adapted to all the presently current demands with respect to the delivery condition and to the guide of the motor-spindle unit. This object is achieved by an electrically height-adjustable head rest device in a seat back of a motor vehicle seat, wherein the device comprises a head rest, at least one bar carrying the head rest, a cross member connected to the at least one bar and comprising an internal thread, and a motor-spindle unit. The spindle unit further comprises a spindle engaging the internal thread, wherein a guide part is provided, and a guide seat for the guide part is provided on one of the cross member and the motor-spindle unit.

The guide seat is provided for the guide part. The guide part can be provided but it may also be absent. The guide seat is always provided. Whether it cooperates with a guide part or not depends on the wishes of the respective manufacturer of the automotive vehicle. By virtue of the guide seat, the head rest device is prepared for a guide part. This guide part can be inserted any time, even at a later stage.

In a preferred developed implementation, the guide part projects toward the part on which the guide seat is disposed. The guide part is fixed by appropriate means to the respective other part on which the guide seat is not provided; it is preferably removably retained and easy to mount. In the inserted condition, the guide part extends parallel to the spindle.

There is provided at least one guide seat. A guide seat is a generally female part of a guide, meaning the guide seat is in particular defined by a cylindrical hollow body the cylinder axis of which extends parallel to the spindle. The cylindrical hollow body can preferably have a lateral opening through which a guide part can be pushed to enter the guide seat. The guide part can be brought into the guide seat through axial introduction or through the just described radial insertion.

Advantageously, there are provided several guide seats. In practical use, it is not necessary to use them all. For each guide seat a guide part can be provided in the other part. For fastening it to the other part, there is provided a retaining means. This retaining means makes it possible to fix a guide part with simple means so that it is allowed to cooperate with the associated guide seat on the other part, meaning the cross member or the motor-spindle unit. If the head rest device is not equipped with a guide part, it has at any rate at least one guide seat on the one part, meaning on the cross member or on the motor spindle unit. Preferably, it has at least one retaining means on the other part, meaning on the motor-spindle unit or on the cross member for fixing a guide part there. If the head rest device is equipped with a guide part, this guide part is either retained by the retaining means or the guide part is fixedly connected. Preferably, the guide means engages the guide seat at least along a portion of the adjustment path of the spindle, possibly over the entire adjustment path. Generally, the guide part is a male part that is received in the guide seat and is guided over a sufficient axial length.

However, the guide seat must not necessarily be a female part; in kinematic reversal it may for example be configured to be a mushroom-shaped or a cylindrical projection around which a slotted tube forming the guide part forms a more or less completely surrounding grip.

In an advantageous developed implementation, the guide part may act as an end limit stop for the adjustment path of the spindle. As a result, no end limit stop must be provided on the spindle itself. This does not exclude an end limit stop on the spindle.

The guide part can be mounted fixedly, in particular integrally, to the associated part, meaning to the cross member or to the motor spindle unit, but it may also be a separate additional part; then, it is preferably releasable.

Other features and advantages will become more apparent upon reviewing the appended claims and the following non restrictive description of embodiments of the invention, given by way of example only with reference to the drawing.

DETAILED DESCRIPTION OF THE INVENTION

Figure 1:
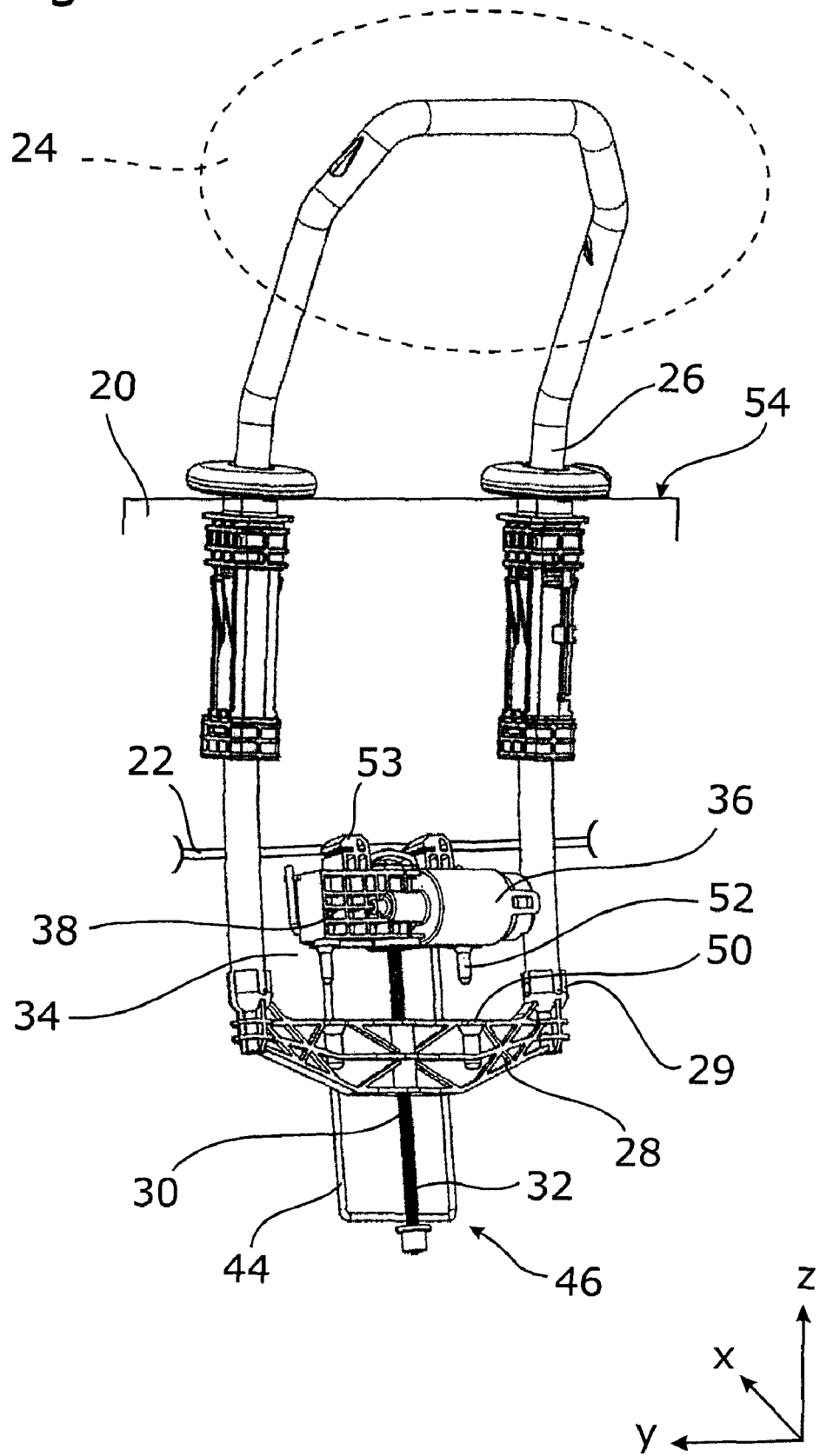
FIG. 1: shows a perspective illustration of a head rest device and of an outlined upper region of a seat back, when viewed obliquely from behind.

The electrically height-adjustable head rest device is allocated to a seat back 20 of a motor vehicle seat. This seat back 20 has a structure part 22. The seat back 20 is known per se; the seat backs used are prior art.

The head rest device has a head rest 24 that is known per se and that is configured according to prior art; it is merely outlined herein. The head rest device further has two bars 26 that carry said head rest 24 and that are formed by a one-piece arrangement in the exemplary embodiment. For this purpose, a piece of tube is substantially shaped in a substantially U shape. The two legs of the U form the bars 26.

The head rest device further has a cross member 28 that is formed from an injection-molded part in the exemplary embodiment shown. It has wells 29 for receiving the lower ends of the bars 26; this connection is implemented according to prior art and is known per se. The cross member 28 connects the lower free ends of the bars 26. In its center it has an internal thread that extends substantially parallel to these bars 26. A spindle 32 engages this internal thread and also extends substantially parallel to the bars 26. It belongs to a motor-spindle unit 34 the main function of which is to rotate the spindle 32. This motor-spindle unit 34 comprises an electric motor 36 and has a body 38 on which the electric motor 36 is retained. The body 38 is preferably an injection-molded part made from plastic. Through a gear, which is known per se, the electric motor 36 rotates the spindle 32.

Figure 2:
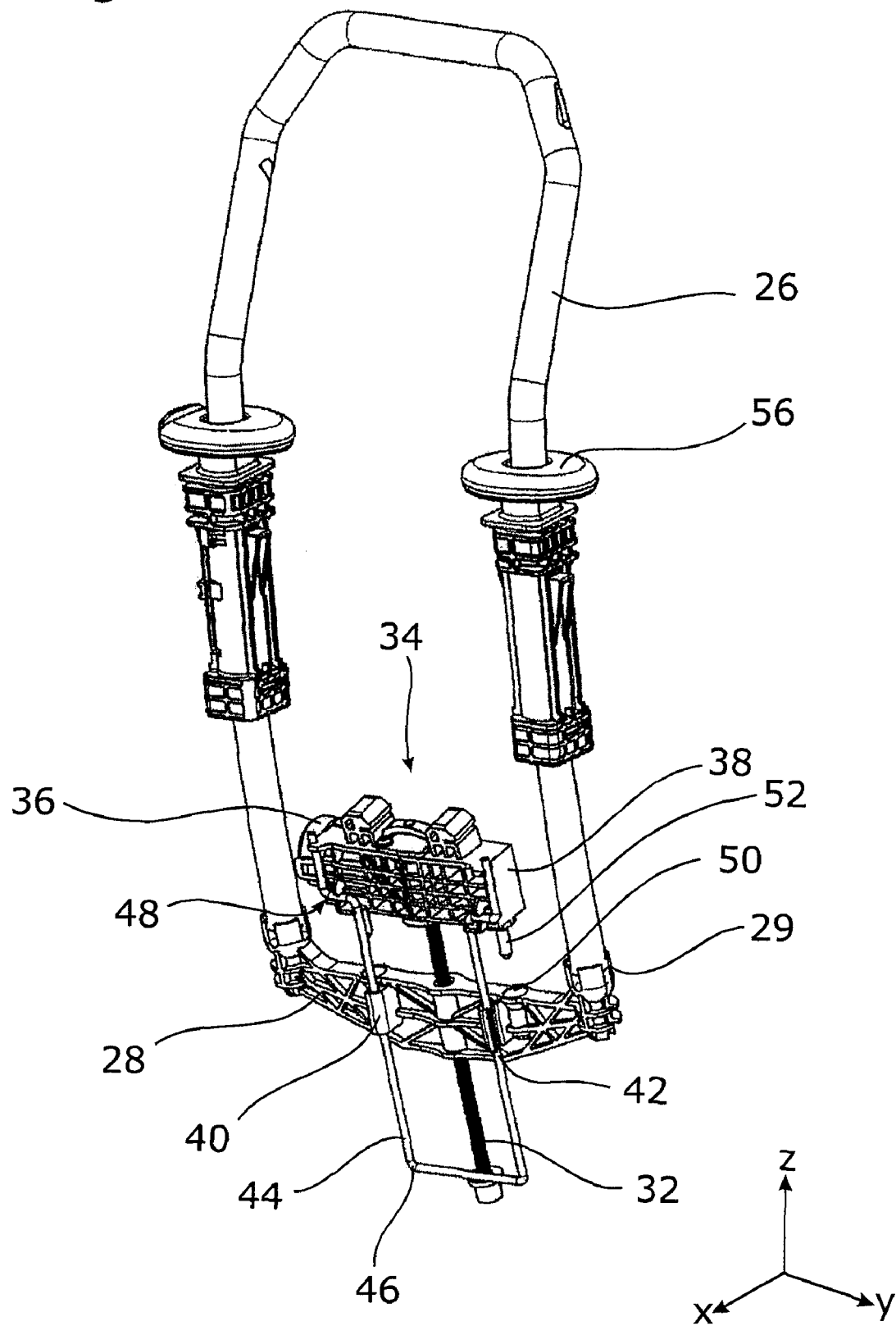
FIG. 2: shows a perspective illustration of the head rest device as shown in FIG. 1, but now without seat back and when viewed obliquely from the top front.

On the cross member 28 there are formed two guide seats 40; they are preferably made or configured integral with the injection-molded part. They define a substantially cylindrical, elongate interior space the cylinder axis of which extends parallel to the spindle 32. They have a longitudinal slot 42 that allows access to this interior space. In the first exemplary embodiment as shown in the FIGS. 1 and 2, each guide seat 40 receives a leg 44 of the U of a guide part 46. This guide part is bent from round stock, such as a steel wire. The guide slot 42 is configured for a leg 44 of the U to be pressed into it from the side, using force. As a result, the legs 44 of the U, or the guide part 46 must not be threaded in the axial direction and one has the possibility to configure the free ends of the legs of the U to be bent at a right angle as can be seen from FIG. 2. The guide seat 40 serves the purpose of guiding a leg 44 of the U or a guide part 46 altogether in the longitudinal direction, meaning parallel to the spindle 32. The cross member 28 is adjustable with respect to the motor-spindle unit 34, which is stationarily associated with the seat back 20 when the spindle 32 is rotated.

The adjustment path depends on the length of the spindle and also on the free length of the legs 44 of the U, the dimension of the cross member 28 having to be deduced every time in the direction of adjustment. In the exemplary embodiment shown, the cross member has its largest dimension where it forms the internal thread 30. Accordingly, this dimension must be taken into consideration when calculating the free adjustment path. In the first implementation, the free adjustment path is given by the length of the legs 44 of the U between the body 38 and the base of the guide part 46 less the described dimension of the cross member 28.

Retaining means 48 for releasably receiving the guide part 46 are provided in the body 38. In the concrete exemplary embodiment, these retaining means 48 are substantially formed from three fixation points, the elasticity of the material of the guide part 46 being additionally used for fastening. As a result, the upper, right-angled end regions of the legs 44 of the U are retained on the one side in lower bight portions open toward the inside and on the other side in upper bight portions open toward the outside. They can be released from the body 38 any time by driving the upper free ends apart and by slightly rotating the body 38.

In the exemplary embodiment shown, there is also provided an additional guide seat 50. It is also formed in the cross member 58 and has the shape of a round channel open toward the top; it is in particular a cylindrical blind hole. This second guide seat 50 is also provided twice in the exemplary embodiment. It cooperates together with a respective second guide part 52 that projects from the underside of the body 38, parallel to the spindle 32 and in the direction of one of the described blind holes. This second guide part 52 is quite short; it only extends over less than ⅓ of the free adjustment path, for example over 5 through 15%. It only comes into action when the cross member 28 and the motor-spindle unit 34 have come sufficiently close, i.e., when the head rest has been raised sufficiently upward for the short, journal-shaped second guide parts 52 to engage the associated second guide seat 50. In the relative position shown in FIG. 1 and in FIG. 2, the second guide part 52 and the respective associated second guide seat 50 are not engaged. The second guide part 52 is configured integral with the body 38, as an injection-molded added part.

Figure 3:
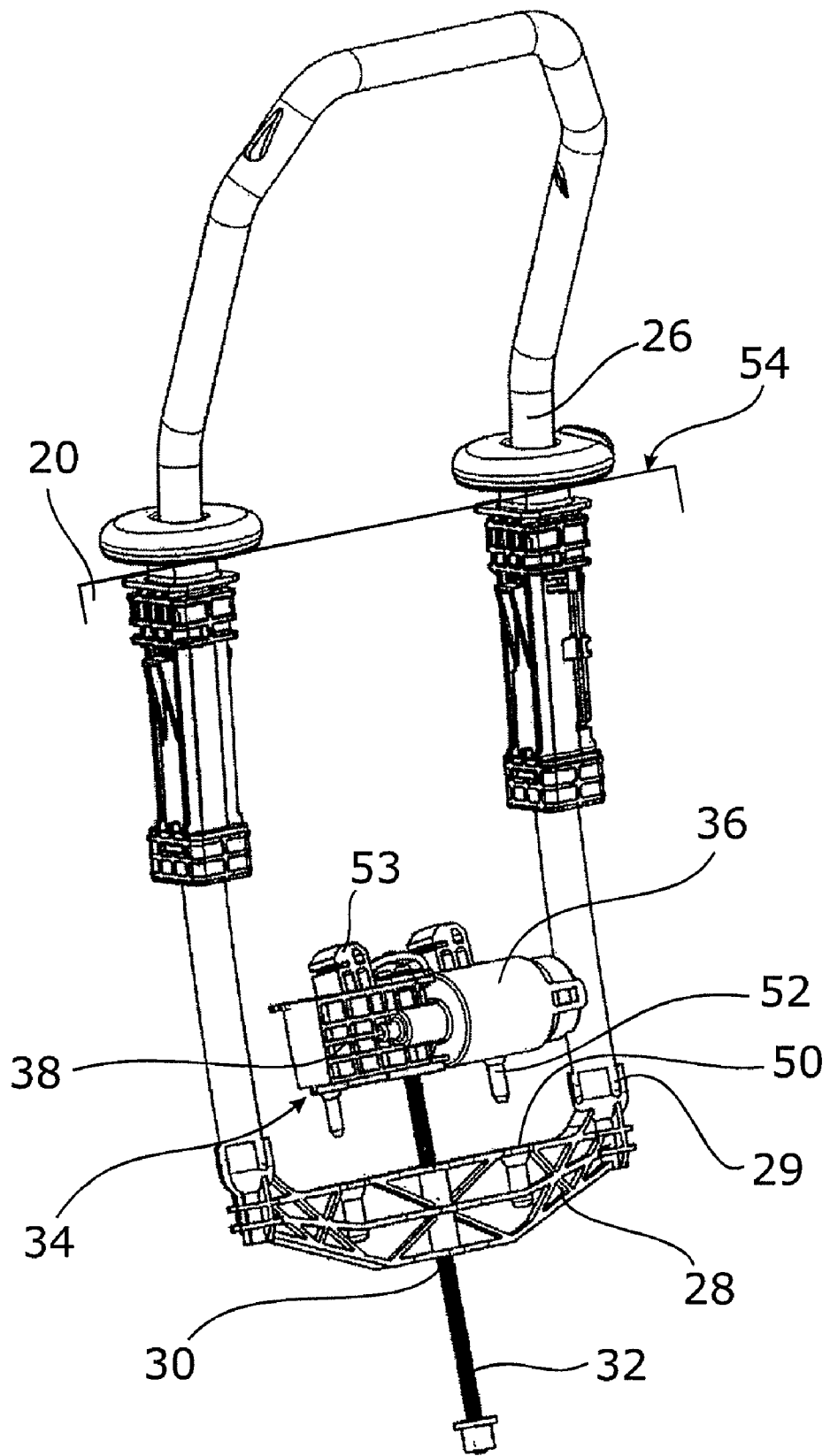
FIG. 3: is a view of a head rest device like in FIG. 1, but without a seat back and without a U-shaped guide part.
Figure 4:
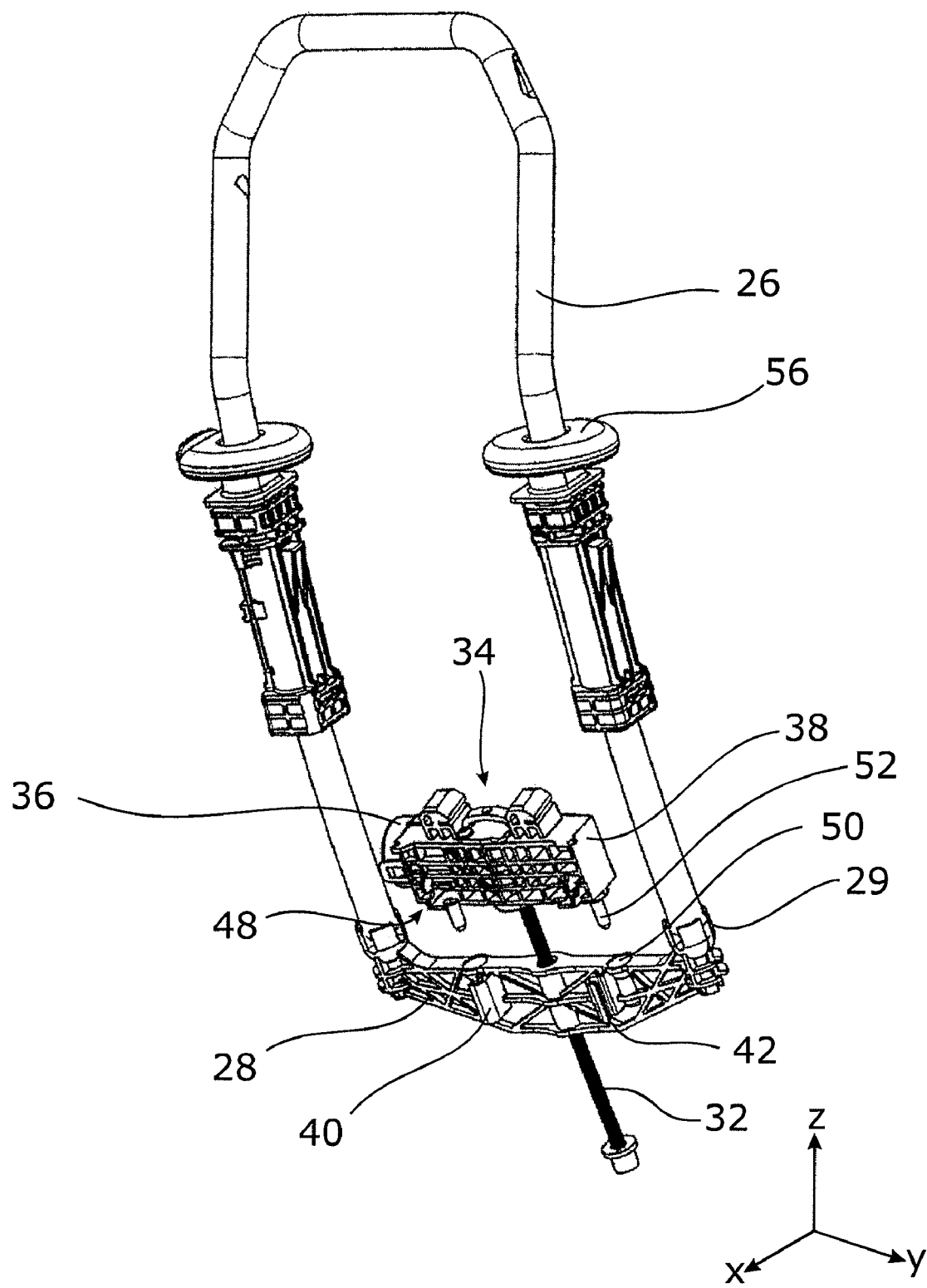
FIG. 4: is a view like FIG. 2 of the head rest device as shown in FIG. 3.
Figure 5:
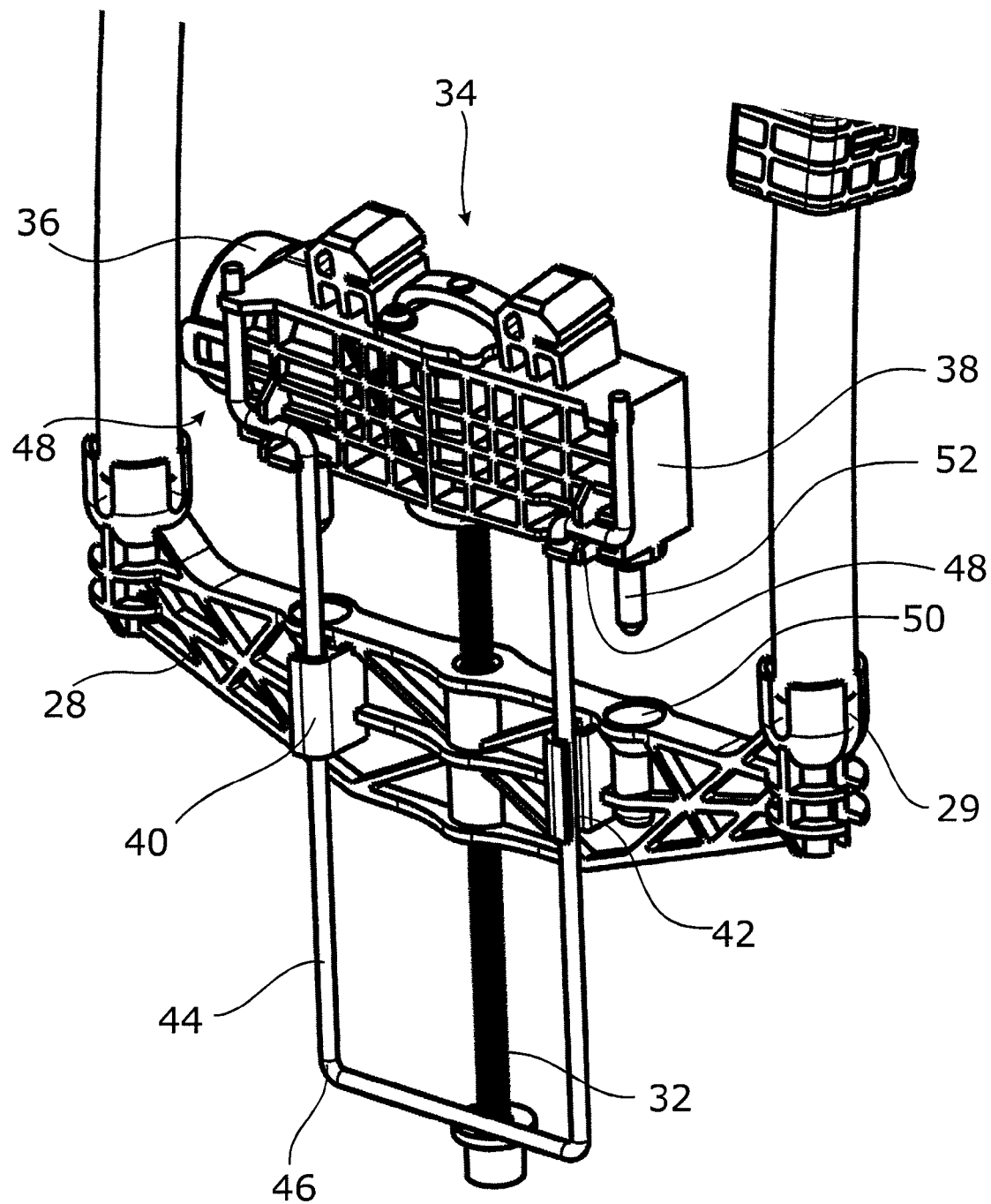
FIG. 5: is an enlarged view of a lower part of FIG. 2.
Figure 6:
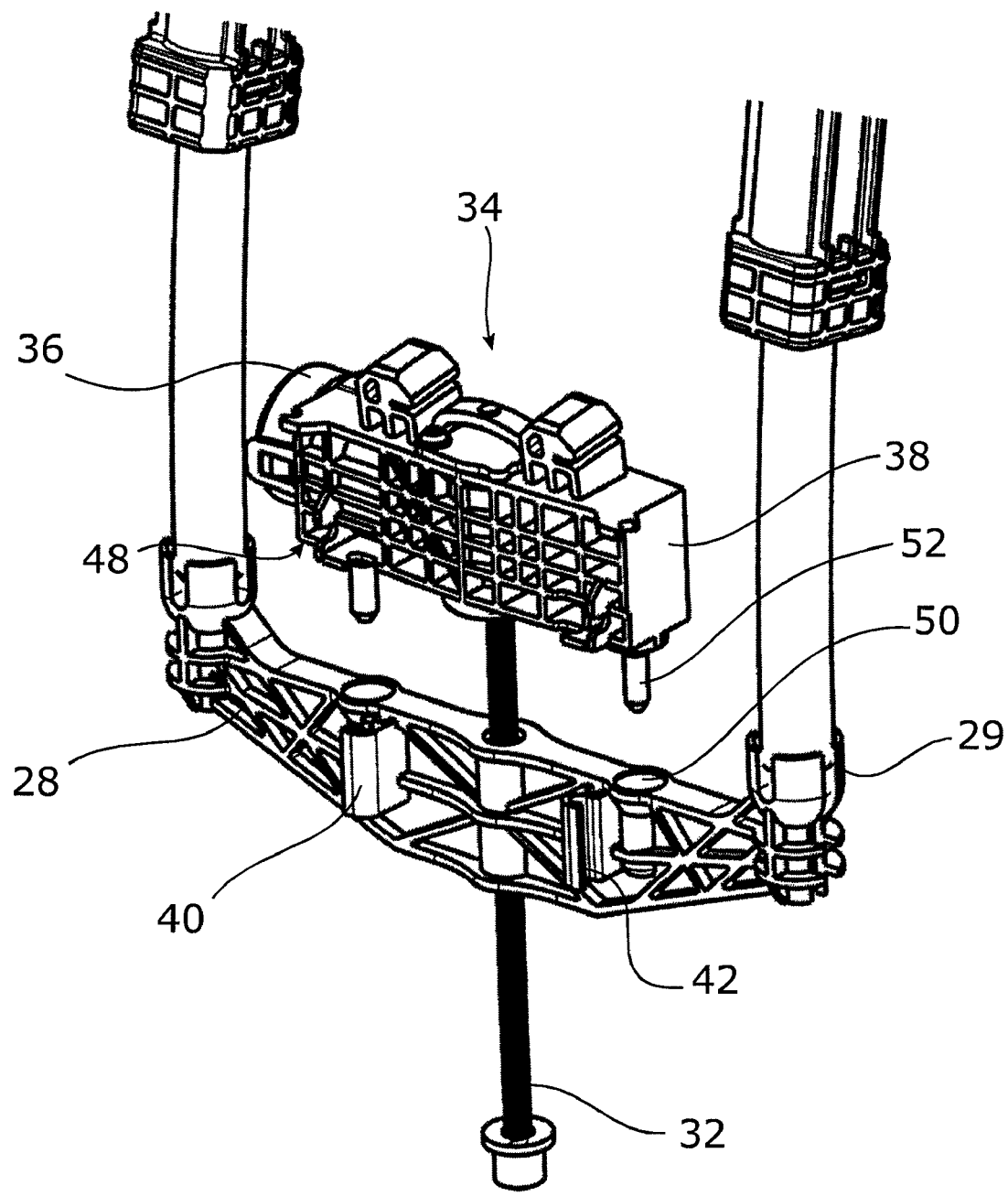
FIG. 6: is an enlarged view of a lower part of FIG. 4.

In the second exemplary embodiment as shown in the FIGS. 3 and 4, this second guide arrangement 50, 52 is the only one provided; the first guide part 46 is absent. In the delivery condition for mounting, the cross member 28 is so close to the motor-spindle unit 34 that the second guide means 50, 52 are engaged. Then the cross member 28, the bar 26 and the head rest 24 are clearly associated to the motor-spindle unit 34.

The motor-spindle unit 34 is fastened to the structure part 22 of the seat back 20. For this purpose, suited fastening means are provided; they are prior art. Pins 53 for example project from the body 38 in the direction opposite to the second guide part 52, said pins being introduced into recesses of the structure part 22; then, they are secured. One thus obtains a non-rotatable connection.

It is however also possible to only provide for one such pin 53, which is provided as a continuation of the spindle in the upper portion of the body 38 and which engages a corresponding recess or a corresponding hole of the structure part 22. As a result, the motor-spindle unit 34 is fixed but still capable of rotating about the axis of rotation of the spindle 32. By virtue of the first guide means, meaning of the first guide part 46 and the first guide seat 50, such a rotation is prevented. Hence, this described solution is not suited for the second exemplary embodiment.

In an upper edge 54 of the seat back 20, sliding pieces 56 are inserted in a known way, said sliding pieces incorporating the bars 26 and being connected to the seat back 20. They form an upper terminus and at the same time the outlet openings for the bars 26. They are also configured according to prior art. The spindle has a limit stop at its lower end.

What is claimed is:

1. An electrically height-adjustable head rest device in a seat back of a motor vehicle seat comprising:
    a head rest;
    at least one bar carrying the head rest;
    a cross member connected to the at least one bar and comprising an internal thread; and
    a motor-spindle unit comprising a spindle engaging the internal thread, wherein a first guide part is provided on one of the cross member and the motor-spindle unit, and a first guide seat for the first guide part is provided on the other of the cross member and the motor-spindle unit, the first guide part is configured to be a U-shaped wire bracket comprising legs extending parallel to the spindle, wherein the legs engage the first guide seat.

2. The electrically height-adjustable head rest device as set forth in claim 1, wherein a retaining means for fastening the first guide part is provided and is disposed on the cross member, and the associated first guide seat is attached to the motor-spindle unit.

3. The electrically height-adjustable head rest device as set forth in claim 1, wherein a retaining means for fastening the first guide part is provided and is disposed on the motor-spindle unit, and the associated first guide seat is attached to the cross member.

4. The electrically height-adjustable head rest device as set forth in claim 1, wherein the first guide part extends parallel to the spindle.

5. The electrically height-adjustable head rest device as set forth in claim 1, wherein the first guide part is long and has a length that is not smaller than the length of a free adjustment path of the spindle.

6. The electrically height-adjustable head rest device as set forth in claim 1, wherein the first guide part is configured to be a metal rod.

7. The electrically height-adjustable head rest device as set forth in claim 1, wherein the first guide part is a separate part formed of a separate element attached to the one of the cross member and the motor-spindle unit.

8. The electrically height-adjustable head rest device as set forth in claim 7, wherein a second guide seat is provided on one of the cross member and the motor-spindle unit and a second guide part is provided on the other of the cross member and the motor-spindle unit and the second guide seat receives the second guide part.

9. The electrically height-adjustable head rest device as set forth in claim 1, wherein the first guide part forms at least one end limit stop for an adjustment path of the spindle.

10. The electrically height-adjustable head rest device as set forth in claim 1, wherein the motor-spindle unit is retained on a structure part of a seat back frame, the motor-spindle unit is one of (i) non-rotatably connected to the structure part or (ii) retained on said structure part and is capable of rotating about the axis of the spindle.

11. An electrically height-adjustable head rest device in a seat back of a motor vehicle seat comprising:
    a head rest;
    at least one bar carrying the head rest;
    a cross member connected to the at least one bar and comprising an internal thread; and
    a motor-spindle unit comprising a spindle engaging the internal thread, wherein a first guide part is provided on one of the cross member and the motor-spindle unit, and at least one of a first guide seat for the first guide part is provided on the other of the cross member and the motor-spindle unit, a second guide part is provided on one of the cross member and the motor-spindle unit, and a second guide seat for the second guide part is provided on the other of the cross member and the motor-spindle unit, the first guide part is long and has a length that is not smaller than the length of a free adjustment path of the spindle and the second guide part is short and has a length that is smaller than about 50% of the length of a free adjustment path of the spindle.

12. The electrically height-adjustable head rest device as set forth in claim 11, wherein the second guide part is short and has a length that is smaller than about 25% of the length of the free adjustment path of the spindle.

13. The electrically height-adjustable head rest device as set forth in claim 11, wherein at least one of the first guide part and the second guide part is provided on the motor-spindle unit.

14. An electrically height-adjustable head rest device in a seat back of a motor vehicle seat comprising:
    a head rest;
    at least one bar carrying the head rest;
    a cross member connected to the at least one bar and comprising an internal thread; and
    a motor-spindle unit comprising a spindle engaging the internal thread, wherein a second guide part is provided on one of the cross member and the motor-spindle unit, and a second guide seat for the second guide part is provided on the other of the cross member and the motor-spindle unit, the second guide part is short and has a length that is smaller than about 50% of the length of a free adjustment path of the spindle.

15. The electrically height-adjustable head rest device as set forth in claim 14, wherein the second guide part is short and has a length that is smaller than about 25% of the length of the free adjustment path of the spindle.

16. The electrically height-adjustable head rest device as set forth in claim 14, wherein the second guide part is configured to be a pin that is injection-molded integral with a main part and the main part belongs to one of the motor-spindle unit and the cross member.

17. The electrically height-adjustable head rest device as set forth in claim 14, wherein, when the electrically height-adjustable head rest device is in a delivery condition for mounting, the cross member is close to the motor-spindle unit and the second guide part and the second guide seat are engaged.

* * * * *